July 2, 1935.  W. HOLM  2,006,677
GAS METER CASING
Filed July 3, 1933  2 Sheets-Sheet 1
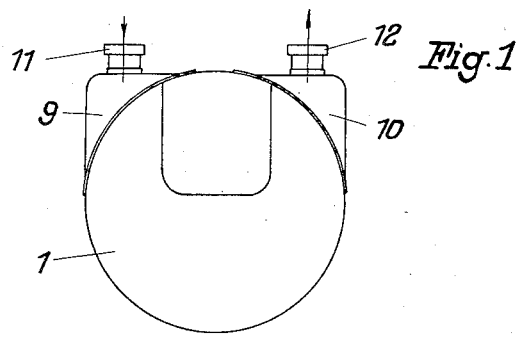
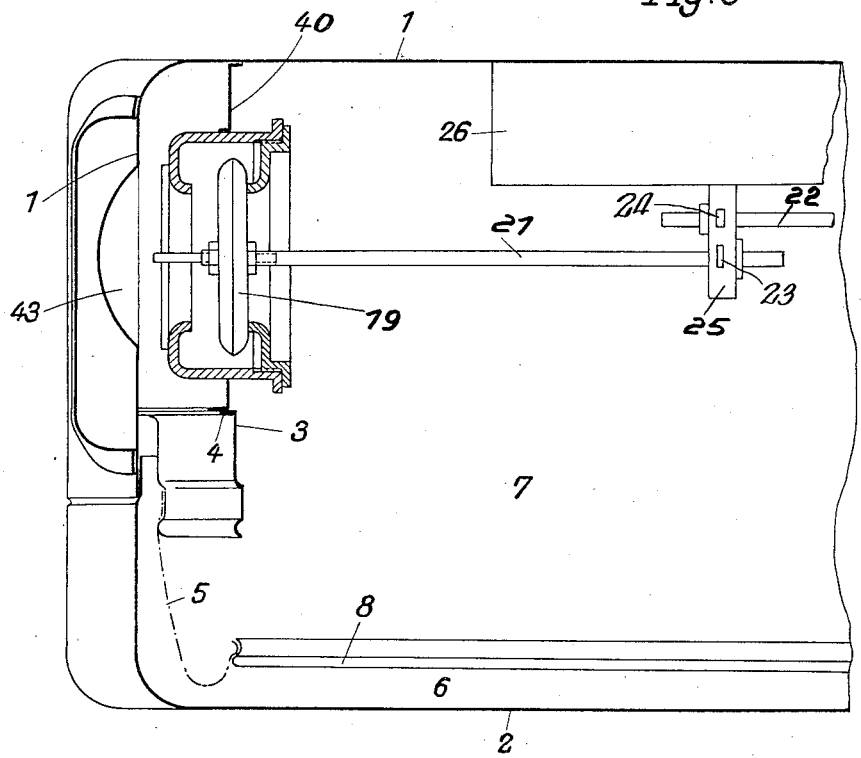
Inventor:
W. Holm
By Marks & Clerk
Attys.

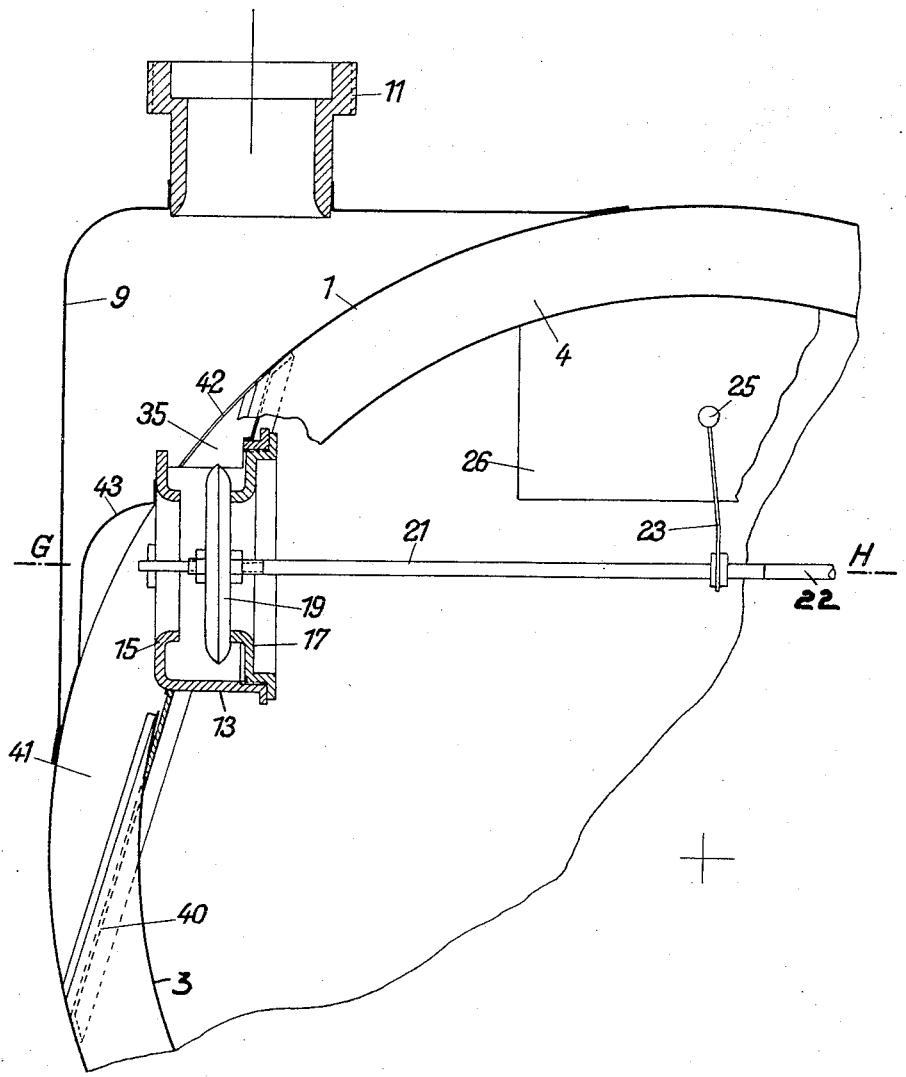

Patented July 2, 1935

2,006,677

UNITED STATES PATENT OFFICE 2,006,677

GAS METER CASING

Waldemar Holm, Furstenwalde/Spree, Germany, assignor to N. V. Machinerieen-en Apparaten Fabrieken "Meaf", Utrecht, Netherlands Application July 3, 1933, Serial No. 678,968
In Germany July 12, 1932

1 Claim. (Cl. 73—1)

This invention relates to dry gas meters of the known type in which the movement of the diaphragm is transmitted to a reversing mechanism which reverses the valves of the gas meter at the end of the strokes of the diaphragm.

The invention has more particularly for its object to provide a cylindrical sheet metal casing for the manufacturing of which the least possible amount of soldering work and sheet metal is required.

Another object of the invention is to provide cylindrical shaped housings for the two double valves of the gas meter which housings contain the two seats for the valve. These valve housings have apertures in their convex surface which communicate directly with the connector casings, whereby separate valve chambers can be dispensed with.

The invention will now be described with reference to the accompanying drawings in which Fig. 1 is a front view of the gas meter casing;

Fig. 2 is a partial vertical section of the gas meter showing one connector casing and one valve only, the arrangement of the other connector casing and the other valve being quite similar, Fig. 3 is a horizontal cross section, taken along line G H of Fig. 2;

Referring now more particularly to the drawings the gas meter housing consists of the front casing 1 and the back casing 2 which are soldered together when the meter is assembled. Inside the front casing 1 there is provided the diaphragm ring 3 which is soldered to the cylindrical wall of the front casing 1 by means of its flange 4. To the diaphragm ring 3 is fastened the diaphragm 5 which is provided with the diaphragm plate 8. This ring together with the diaphragm divides the interior of the casing into two measuring chambers, the front chamber 7 and the back chamber 6. The cylindrical wall of the front casing is provided with the inlet connector casing 9 and the outlet connector casing 10 carrying the connecting pieces 11 and 12 for connecting the gas inlet and outlet pipes.

Into the front casing a wall 40 is soldered beneath each of the connector casings reaching from the bottom portion of the front casing as far as the flange 4 of the diaphragm ring 3. By these walls the segment shaped chambers 41 are formed. On the places where the flange 4 would cover these chambers, this flange is correspondingly cut off, the diaphragm ring 3 at these places being soldered to the wall 40. The chambers 41 therefore communicate with the back measuring chamber 6.

Into suitable holes in the walls 40 the valve housings 13 are inserted, their axes being arranged horizontally. The bottoms of these valve housings are provided with the outer seatings 15 while the covers by means of which these housings are closed carry the inner seatings 17. The valves 19 which cooperate with the seatings 15 and 17 are controlled by means of their spindles 21 and 22 and the leaf springs 23 and 24 fastened to the shaft 25 of the reversing mechanism which is arranged within the gas tight box 26 and which serves in known manner for reversing the valves. In the cylindrical wall of the front casing 1 within the connector casings 9, 10 holes 42 are provided adjacent the apertures 35 in the convex surface of the valve housings 13. The sheet metal that has to be put aside when cutting the holes 42 is however not removed but bent inwards to form a channel between these holes 42 and the apertures 35, and is soldered to the valve housings. Through these channels the interiors of the valve housings 13 communicate with the connector casings 9 and 10 respectively. In order to have a sufficient cross section for the flow of gas passing from the valve housings to the segment shaped chambers or vice versa, the cylindrical wall of the front casing 1 may be bulged out within the connector casings, as shown at 43.

The operation of the gas meter is the following. In the position of the valves shown in the drawings the gas entering through the inlet passes the connector casing 9 and through the aperture 35 in the housing 13 of the inlet valve enters the latter. The outer seat 15 being not covered by the valve 19, the gas passes through chamber 41 into the back measuring chamber 6. The diaphragm 5 and its plate 8 are thereby moved towards the front of the gas meter and push the gas contained in the front measuring chamber 7 through the uncovered inner seat of the outlet valve housing, through the connector casing 10 to the outlet of the gas meter. When the diaphragm has finished its stroke in this direction the valves are reversed by the reversing mechanism provided in the box 26. Then the gas entering the meter passes from the inlet valve housing through the inner seat 17 of the valve housing 13 into the front measuring chamber 7, pushing the diaphragm back again. Thereby the gas in the back measuring chamber 6 is forced to leave the gas meter through the outer seating of the outlet valve and through the outlet connector casing 10.

I claim:

A casing for a dry valve gas meter comprising a front casing, a back casing, a diaphragm ring provided with a flange soldered to the front casing, a diaphragm, a diaphragm plate, said diaphragm being connected to the diaphragm ring and the diaphragm plate, said ring, diaphragm and plate dividing the interior of the casing in a front measuring chamber and a back measuring chamber, a connector casing provided with a connecting piece, a wall soldered into the front casing, forming a segment shaped chamber, a cylindrical valve housing, a cover for said housing, valve seatings being provided in said housing and in the cover, a valve adapted to cooperate with said seatings, an aperture in the convex surface of the valve housing, an aperture in the front casing adjacent the aperture in the valve housing, the valve housing being inserted into the front casing in such a manner, that the valve seating in the cover of the valve housing communicates with the front measuring chamber, the seating of the valve housing communicating with the segment shaped chamber, a channel by means of which the aperture in the front casing communicates with the corresponding aperture in the valve housing, the flange of the diaphragm ring being partly cut off to provide communication between the segment shaped chamber and the back measuring chamber.

WALDEMAR HOLM.